(12) United States Patent
Buxbaum

(10) Patent No.: US 10,367,208 B2
(45) Date of Patent: Jul. 30, 2019

(54) HIGH EFFICIENCY FUEL REFORMING AND WATER USE IN A HIGH TEMPERATURE FUEL-CELL SYSTEM AND PROCESS FOR THE SUCH THEREOF

(71) Applicant: Robert E. Buxbaum, Oak Park, MI (US)

(72) Inventor: Robert E. Buxbaum, Oak Park, MI (US)

(*) Notice: Subject to any disclaimer, the term of this patent is extended or adjusted under 35 U.S.C. 154(b) by 605 days.

(21) Appl. No.: 15/091,427

(22) Filed: Apr. 5, 2016

(65) Prior Publication Data

US 2016/0329582 A1 Nov. 10, 2016

Related U.S. Application Data

(60) Provisional application No. 62/157,637, filed on May 6, 2015.

(51) Int. Cl.
*H01M 8/04089* (2016.01)
*H01M 8/1246* (2016.01)
(Continued)

(52) U.S. Cl.
CPC ... *H01M 8/04097* (2013.01); *H01M 8/04007* (2013.01); *H01M 8/04156* (2013.01); *H01M 8/04201* (2013.01); *H01M 8/0668* (2013.01); *H01M 8/0687* (2013.01); *H01M 8/1246* (2013.01); *H01M 8/145* (2013.01);
(Continued)

(58) Field of Classification Search
None
See application file for complete search history.

(56) References Cited

U.S. PATENT DOCUMENTS 3,266,938 A 8/1966 Parker et al.
4,395,468 A 7/1983 Isenberg
(Continued)

FOREIGN PATENT DOCUMENTS

| EP | 0600621 A1 | 6/1994 |
| EP | 0654838 A1 | 5/1995 |
| WO | 0013791 A1 | 3/2000 |

OTHER PUBLICATIONS

Chick, Larry "Solid Oxide Fuel Cell and Power System Development at PNNL", Energy Materials Group Pacific Northwest National Laboratory, Mar. 29, 2011; Pacific Northwest National Laboratory; 33 pp.; http://www.energy.gov/sites/prod/files/2014/03/f10/apu2011_9_chick.pdf.
(Continued)

*Primary Examiner* — Sarah A. Slifka
(74) *Attorney, Agent, or Firm* — Avery N. Goldstein; Blue Filament Law PLLC

(57) ABSTRACT

A method of operating a fuel cell system to produce electrical power that includes a hydrocarbon or alcohol fuel feed stock containing water vapor or steam being reformed in the fuel cell or in a separate reformer with the output gas from the fuel cell going to a water gas shift reactor to convert a portion of the carbon monoxide to carbon dioxide and hydrogen. A portion of the carbon dioxide then being removed to yield a hydrogen rich gas that is piped back into the solid oxide fuel cell or the molten carbonate fuel cell in concert with the reformed or unreformed fuel feed stock. A system for performing the method is also provided.

17 Claims, 1 Drawing Sheet

(51) Int. Cl.
  *H01M 8/14* (2006.01)
  *H01M 8/04007* (2016.01)
  *H01M 8/04119* (2016.01)
  *H01M 8/04082* (2016.01)
  *H01M 8/0668* (2016.01)
  *H01M 8/0662* (2016.01)

(52) U.S. Cl.
  CPC .. *H01M 2008/147* (2013.01); *H01M 2250/10* (2013.01); *H01M 2250/20* (2013.01); *Y02B 90/14* (2013.01); *Y02E 60/525* (2013.01); *Y02E 60/526* (2013.01); *Y02P 70/56* (2015.11); *Y02T 90/32* (2013.01)

(56) References Cited

U.S. PATENT DOCUMENTS

| | | | |
|---|---|---|---|
| 4,490,444 | A | 12/1984 | Isenberg |
| 4,696,871 | A | 9/1987 | Pinto |
| 4,808,491 | A | 2/1989 | Reichner |
| 4,876,163 | A | 10/1989 | Reichner |
| 4,925,456 | A | 5/1990 | Egglestone |
| 5,364,506 | A | 11/1994 | Gur et al. |
| 5,366,819 | A | 11/1994 | Hartvigsen et al. |
| 5,516,344 | A | 5/1996 | Corrigan |
| 5,646,387 | A | 7/1997 | Schmid et al. |
| 5,676,806 | A | 10/1997 | Van Berkel et al. |
| 5,731,097 | A | 3/1998 | Miyashita et al. |
| 5,733,675 | A | 3/1998 | Dederer et al. |
| 6,190,623 | B1 | 2/2001 | Sanger et al. |
| 6,264,828 | B1 * | 7/2001 | Baker ................ C10G 49/007 208/100 |
| 6,569,553 | B1 | 5/2003 | Koripella et al. |
| 6,589,680 | B1 | 7/2003 | Gorte et al. |
| 6,699,609 | B2 | 3/2004 | Kotani et al. |
| 6,793,698 | B1 | 9/2004 | Sanger et al. |
| 7,014,942 | B2 | 3/2006 | Gorte et al. |
| 7,704,618 | B2 | 4/2010 | Venkataraman et al. |
| 8,394,544 | B2 | 3/2013 | Chick et al. |
| 8,435,683 | B2 | 5/2013 | Finnerty et al. |

OTHER PUBLICATIONS

Klinghoffer, Naomi B.; Barrai, Federico; Castaldi, Marco J.; "Autothermal Reforming of JP8 On A Pt/Rh Catalyst: Catalyst durabiltiy studies and effects of sulfur", Journal of Power Sources 196 (2011) 6374-6381. 1 pg.; journal homepage: www.elsevier.com/locate/jpowsour; https://ccllabs.files.wordpress.com/2012/10/abstract_klinghoffer_jps_20112.pdf.

Frost, Lyman; Hartvigsen, Joseph; Elangovan, Singaravelu; "Logistic Fuel Reformer for TARDEC"; 3 pp.; Ceramatec, Inc.; http://www.ceramatec.com/documents/fuel-processing/cold-plasma-reforming/Logistic-Fuel-Reformer-for-TARDEC.pdf.

King, D.L; King, D.A.; Whyatt, G.A.; Fischer, C.M.; Huang, X; Yang, X.; "Integrated 10kWe Hydrodesulfurizer-Microchannel Steam Reformer for Fuel Cell Power from JP-8 and Road Diesel", Pacific Northwest National Laboratory, Richland WA 99352; 1 pg.

* cited by examiner

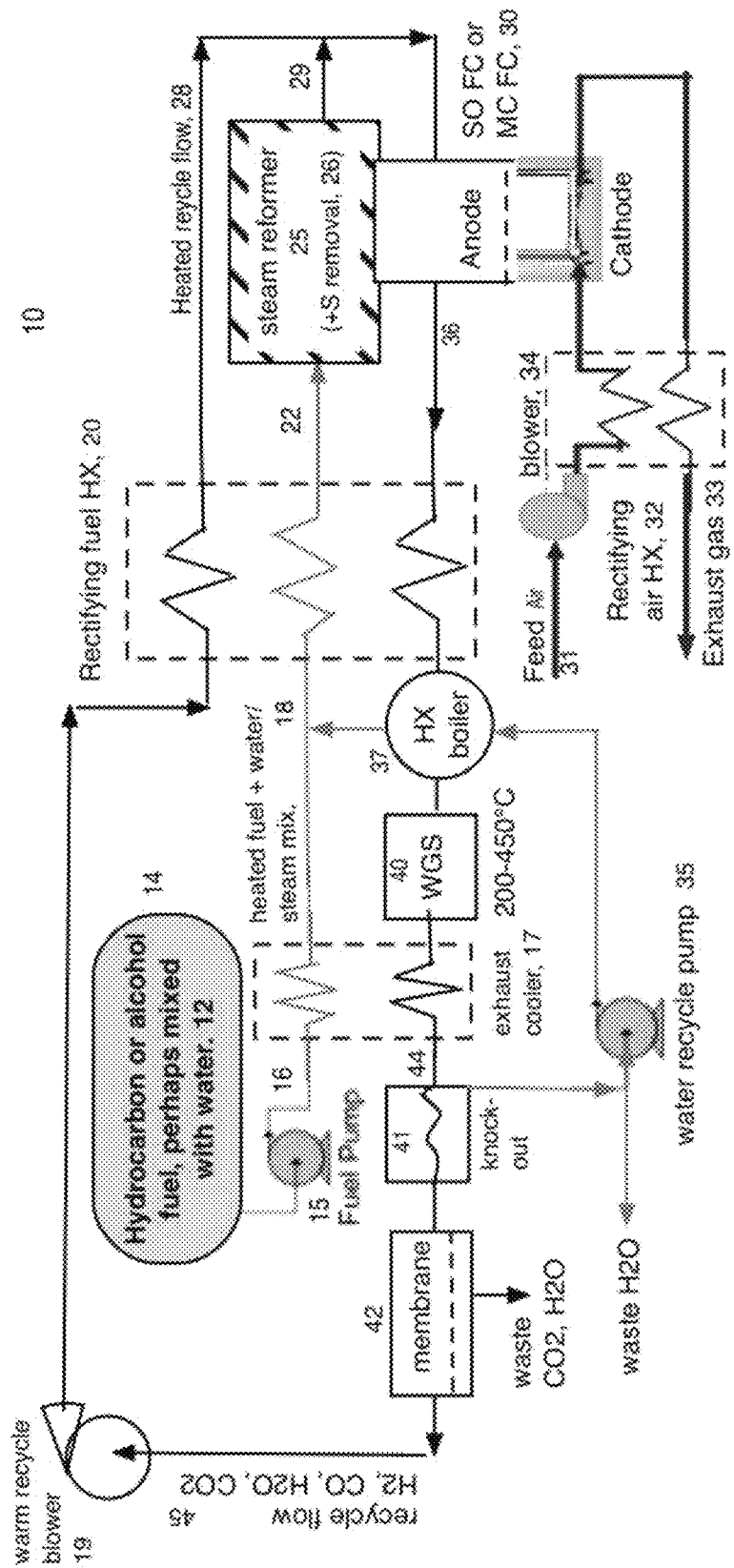

HIGH EFFICIENCY FUEL REFORMING AND WATER USE IN A HIGH TEMPERATURE FUEL-CELL SYSTEM AND PROCESS FOR THE SUCH THEREOF

RELATED APPLICATIONS

This application claims priority benefit of U.S. Provisional Application Ser. No. 62/157,637 filed 6 May 2015; the contents of which are hereby incorporated by reference.

FIELD OF THE INVENTION

The present invention in general relates to hydrogen reforming and fuel cells, and in particular, to the reforming of fuels in conjunction with their use in solid oxide or other high temperature fuel cells.

BACKGROUND OF THE INVENTION

The reliability of high-temperature solid oxide fuel cells (SOFCs) has improved over the last ten years to the point that they are attractive options for electric power generation in some automobiles, airplanes, and auxiliary power supplies. When SOFCs, or to a lesser extent molten carbonate fuel cells (MCFCs), are operated at high temperatures they tolerate high concentrations of carbon monoxide and sulfur in the form of SOx and hydrogen sulfide, and are capable of a limited degrees of in-situ reforming—something that is advantageous from the stand-point of fuel logistics. It is far easier to transport fuel-energy as a liquid fuel or as methane gas, than as a large volume of hydrogen gas. There are however a few problems with in-situ reforming however, and a major one is the danger of coking, a problem that gets worse when dealing with the more-desirable, heavier fuels, e.g. gasoline and jet fuel JP-8. Another problem is that, at high temperatures, the carbon tends to leave the fuel cell as carbon monoxide instead of as carbon dioxide. Carbon monoxide is toxic, and the emission thereof represents an energy inefficiency.

Thus, there exists a need for a system containing a SOFC or MCFC that reforms carbon-based fuels to generate usable energy at high efficiency and has reduced levels of carbon monoxide emissions and a lower tendency for coking.

SUMMARY OF THE INVENTION

A method of operating a fuel cell system to produce electrical power which includes a carbon-based fuel feed stock containing water vapor or steam being reformed to produce hydrogen in a solid oxide fuel cell or a molten carbonate fuel cell or in a reactor upstream of same. The fuel-hydrogen is reacted in the fuel cell with an oxygen or air steam to produce electrical power and an output gas containing carbon monoxide and water. The output gas from the fuel cell is then reacted in a water gas shift reactor to convert a portion of the carbon monoxide to carbon dioxide and a hydrogen-rich reacted gas output. A portion of the carbon dioxide and water are then removed, ideally via membrane, with the remaining, hydrogen-rich gas being returned to the solid oxide fuel cell or the molten carbonate fuel cell in concert with the reformed or unreformed fuel feed stock.

A version of the method is shown in FIG. 1. A fuel feed to a solid oxide fuel cell (SOFC) or molten carbonate fuel cell (MCFC) is placed in thermal communication with a regenerative heat exchanger and mixed with a hydrogen-rich gas, In the fuel cell, the mixture produces electricity to power a load. The output gas from the fuel cell is cooled and fed into a water gas shift reactor followed by a membrane or other means that extracts carbon dioxide and other waste from the stream exiting the water gas shift reactor. The water gas shift reactor converting carbon monoxide to carbon dioxide and also generating a hydrogen rich gas that includes carbon dioxide. The extracted carbon dioxide leaves the system at near atmospheric pressure, and the non-extracted hydrogen rich gas is recycled via piping to the fuel cell by way of a blower, fan, or Venturi. The fuel feed, in this case, being a hydrocarbon or alcohol fuel stock. Exemplary loads include an airplane, a ship, a submarine, a truck, a train, and a bus; as well as stationary applications such as buildings.

BRIEF DESCRIPTION OF THE DRAWINGS

The present invention is further illustrated with respect to the following figure that is intended to be exemplary of the specific aspects of the present invention, but should not be construed as limiting the appended claims to those aspects shown in the figure.

FIG. 1 is a schematic of flows for a power generation apparatus operating according to the inventive method described. The green lines in the figure showing the flow of unreformed fuel and of water or steam; the blue lines show the flow of air to and from the fuel cell; and the black lines show the flow of reformed fuel and/or fuel cell output gases. Many of the components in the figure are optional.

DETAILED DESCRIPTION OF THE INVENTION

The present invention has utility as a SOFC or MCFC system and a process for operation thereof that is more efficient than conventional systems. The inventive system relies on the use of a water-gas shift reactor and a $CO_2$-extraction membrane.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4. It is also to be understood that, where a series of components are listed, these are only descriptive. An actual system could contain more or fewer components and would still operate substantially the same.

An inventive system is depicted in FIG. 1 generally at 10, a fuel feed stock 12, e.g. stored in a fuel tank 14. Fuels operative as feed stock 12 herein illustratively include propane, methane, gasoline, military diesel fuel (JP-8), ethanol, methanol, combinations thereof, by themselves or mixed with water. The fuel feed stock 12 enters fuel pump 15 and is conveyed by piping 16, heated and perhaps heated by exhaust 17 and mixed with steam or partially boiled water to produce a heated fuel water/steam mix 18. This mix is heated further in a fuel heat exchanger (HX) 20 and is heated there to a temperature typically between 450 and 800° C. The heated mixture 22 enters either steam reformer 25 or directly into the SOFC or MCFC 30. In some inventive embodiments the steam reformer 25 is coupled with a sulfur removal stage 26. Regardless of whether the reformer or sulfur removal stage 26 is present, the fuel mix 29 enters a SOFC or MCFC 30. Typically the fuel will be mixed with a heated recycle flow 28. The operating pressure for the fuel cell 30 will typically be 45-150 psi (3-10 atm). As such, a pump is shown for the fuel 15 and for the water recycle 35. Operating at elevated pressures allows the process to exhaust most of the product CO2 to atmosphere by use of a passive membrane. Attractive solid oxide fuel cells for this application are provided by Versa Systems, Acumetrics, Protonex, Siemens and Bloom Energy. Molten Carbonate fuel cells are provided by Fuel Cell Energy. Typical MCFC and SOFC operating temperatures here range from 600 to 1000° C.

As shown in FIG. 1, the steam reformer 25 is not adiabatic, but is intimately attached to the SOFC or MCFC 30. A result of the attachment is that heat is provided to the reformer 25 from the SOFC or MCFC 30. As with much in FIG. 1, it will be appreciated that this is not necessary but is a specific inventive embodiment. The reformer could be essentially adiabatic, or for some versions of this invention, all the fuel reformation could take place in the fuel cell itself. A recycle stream of hydrogen-rich gas 28 is joined with the reformed mixture 29 prior to entering the SOFC or MCFC 30. Pressure for the recycle is provided via a blower, fan, or Venturi, a blower 19 being shown in FIG. 1. This hydrogen-rich recycle flow 28 adds to the power generated by the SOFC or MCFC 30. It also adds to the heat generated by the SOFC or MCFC 30 and to the amount of water in the SOFC or MCFC 30. Typical ratios of fuel mixture to hydrogen-rich gas volume to fuel mix vapor volume range from 1:3 to 3:1 on an slpm basis. The net effect of the inclusion of hydrogen-rich gas 28 with the fuel mixture 22 or 29 is to increase the power output per unit of fuel gas 22, going to the SOFC or MCFC 30. It is also predicted that adding the recycle flow 28 will reduce the tendency for coking in the fuel cell 30 by providing heat and water for steam reforming.

The cathode of the SOFC or MCFC 30 has a feed of oxygen-rich gas 31. This gas is typically air. Here it is shown to enter the fuel cell 30 through a rectifying air heat exchanger (HX) 32. This heat exchanger 32 heats the oxygen-rich gas before it enters the fuel cell 30, and cools the exhaust gas 33 flowing away from the fuel cell 30. Typical oxygen-rich gases 31 include air, pure oxygen, or air mixed with CO2 (common with MCFC). The feed oxygen source 33 may be provided at a variety of pressures ranging from ambient air pressure to more than 10 atm; a blower, 34 is shown. In some inventive embodiments, the exhaust gas 33 or a portion thereof is used to provide compression energy to the fuel pumps 15, 35 or to the blowers 19, 34.

The hydrogen-rich gas 28 is produced via a water-gas-shift reactor (WGS) 40 operating in conjunction with at least one heat exchanger 20, 37, and a carbon dioxide extraction membrane 42. Most versions of invention will need at least one heat exchanger 20,37 for the fuel exhaust 36 because it is expected that the fuel cell 30 will operate at a higher temperature than is desirable for feed to the WGS 40. At these higher temperatures, the SOFC or MCFC 30 generates considerable carbon monoxide in the output gas 36. By cooling the output gas 36 and sending it to the WGS 40, we convert some of the CO to CO2 and H2. REB Research has made and sold water-gas shift reactors.

It is now necessary to remove the waste water and CO2 produced in the process. As shown in FIG. 1, this is done via a knockout drum 41 and/or a carbon dioxide specific membrane 42. The use of these means allows the process to discard the majority of the water and CO2 in the recycle stream 44 without discarding the majority of the hydrogen and without significantly decreasing the pressure of the hydrogen-rich recycle gas 44, 45. By removing the CO2 and H2O using 41 and 42, we expect to find that the recycle flow, 45 has a higher $H_2$-concentration than the feed gas 44, and that it is relatively low in temperature, and at pressure where it can be easily sent back to the fuel cell 30, e.g. via a low-cost blower 19. This is a lower cost, lower energy option than if a hydrogen-specific membrane were to be used instead. Several types of $CO_2$-extracting membranes 42 are available. Most will also extract water and $H_2S$. Use of the membrane 42 to extract water could allow the system to operate without the water knockout 41.

The membrane 42 operative herein illustratively includes polymers such as polyacetylenes polyaniline poly (arylene ether)s, polyarylates, polycarbonates, polyetherimides, poly (ethylene oxide), polyimides, poly(phenylene ether), poly (pyrrolone)s and polysulfones; carbon; silicas; zeolites; mixed-matrix; hybrid membranes; and facilitated transported membranes as detailed in H. Yang et al. Journal of Environmental Sciences 20(2008) 14-27. The Polaris membrane from MTR Inc. is a silicone polymers, e.g. dimethylsiloxane, that is exemplary of a membrane 42. It shows $H_2$—$CO_2$ selectivity of about 30 with an operating temperature, ≤50° C. The use of Polaris and similar $CO_2$-extracting membranes requires that the output from the WGS 40 must be cooled from a typical WGS temperature of 200-450° C. to 50° C. or below. A cooling heat exchanger 17 is shown. Since water will condense at 50° C. a water knock-out 41 is shown. It is appreciated that a membrane 42 operating at higher temperatures, e.g. 125° C., or above could preclude the use of the knockout 41, or the need for a heat exchanger boiler 37. In such cases we may use membranes, one to extract $CO_2$ the other for water, or we may rely on the single membrane 42 to extract both $CO_2$ and $H_2O$.

A key operating issue involves heating in response to load changes. One heating technique, useful once the SOFC or MCFC 30 is at operating temperature, is to adjust the voltage at the SOFC or MCFC 30. The lower the voltage, the lower the efficiency, the more chemical energy is available for heat. At steady state operation, the aim is to operate the SOFC or MCFC 30 at 0.8-1.0 Volts. The rectifying heat exchangers, particularly 20 and 34 allow one to produce electricity at these voltages while providing sufficient heat to reform most hydrocarbon fuels. Without the heat exchangers and the hydrogen-rich recycle, steam-reforming would be too endothermic to allow efficient in-situ reforming with such efficient power generation.

FIG. 1 shows a separate reforming reactor 25 in thermal contact with the FC 30. Though it is appreciated that reforming functionality is available in current MCFCs and SOFCs, it is the inventor's expectation that a separate reformer 25 will be advantageous because it provides additional room for catalyst. The separate reformer 25 is shown to be in thermal contact with the SOFC or MCFC 30 because most fuel reforming requires heat. FIG. 1 shows water being recycled to the fuel stream through the use of the knockout 41 and the water recycle pump 35. There is also a water HX boiler, 37 that may or may not be included in all embodiments of the water recycle.

The foregoing description is illustrative of particular embodiments of the invention, but is not meant to be a limitation upon the practice thereof. The following claims, including all equivalents thereof, are intended to define the scope of the invention.

The invention claimed is:

1. A method of operating a power-producing solid oxide fuel cell (SOFC) or a molten carbonate fuel cell (MCFC) comprising fueling the SOFC or MCFC fuel cell with a fuel feed stock of hydrocarbon or alcohol fuel and non-extracted, hydrogen-rich gases, wherein reforming of the fuel feed stock occurs within the SOFC or MCFC, where the output stream from the fuel cell goes to a heat exchanger followed by a hydrogen-producing water gas shift (WGS) reactor followed by a carbon dioxide extractor that extracts a portion of the carbon dioxide ($CO_2$) and water ($H_2O$); the extracted carbon dioxide leaving the system at near atmospheric pressure, and the non-extracted, hydrogen-rich gases being recycled to the SOFC or MCFC fuel cell by way of a pump, blower, fan, or Venturi.

2. The method of claim 1 where the carbon dioxide extractor is a carbon-dioxide permeable membrane.

3. The method of claim 2 wherein the membrane is of the silicone type.

4. The method of claim 1 wherein the water gas shift reactor operates at temperatures between 200° C. and 400° C.

5. The method of claim 1 further comprising reducing the amount of water in the output stream of at least one of a membrane, a knock-out drum, or a steam trap.

6. The method of claim 5 wherein at least half of the water in the reacted gas is removed.

7. The method of claim 1 wherein carbon dioxide and water are removed from the reacted output gas at temperatures between 40° C. and 180° C.

8. The method of claim 1 wherein the solid oxide fuel cell or molten carbonate fuel cell have input pressures of 3 atm to 10 atm.

9. The method of claim 1 further comprising heat-exchange cooling the reacted output gas exiting the water gas shift reactor and prior to removing the portion of the carbon dioxide.

10. The method of claim 1 wherein fuel is reformed prior to, or after the solid oxide or molten carbonate fuel cell in a catalyst-filled steam reformer.

11. The method of claim 10 in which the catalyst-filled steam reformer is in thermal contact with the solid oxide fuel cell or molten carbonate fuel cell and absorbs heat from the fuel cell.

12. The method of claim 10 further comprising desulfurizing the fuel feed stock prior to contacting the solid oxide fuel cell or molten carbonate fuel cell.

13. The method of claim 1 wherein the fuel feed stock is selected from the group consisting of: propane, methane, gasoline, military diesel fuel, ethanol, and methanol.

14. The method of claim 1 where the water from the water extraction is recycled and mixed with the fuel stream to the fuel cell.

15. The method of claim 1 wherein an oxygen source to the fuel cell is selected from the group consisting of: air or pure oxygen.

16. The method of claim 1 wherein the heat exchanger cools the exhaust from the fuel cell before it enters the WGS, and provides that heat to incoming fuel, to a water boiler, or to the hydrogen-rich recycle flow.

17. The method of claim 1 where the fuel cell is of the solid oxide type and operates at temperatures in excess of 800° C.

* * * * *